US006897636B2

(12) United States Patent
Harris

(10) Patent No.: US 6,897,636 B2
(45) Date of Patent: May 24, 2005

(54) METHOD AND CIRCUIT FOR SCALING AND BALANCING INPUT AND OUTPUT CURRENTS IN A MULTI-PHASE DC-DC CONVERTER USING DIFFERENT INPUT VOLTAGES

(75) Inventor: Matthew B. Harris, Durham, NC (US)

(73) Assignee: Intersil Americas Inc., Milpitas, CA (US)

(*) Notice: Subject to any disclaimer, the term of this patent is extended or adjusted under 35 U.S.C. 154(b) by 0 days.

(21) Appl. No.: 10/357,924

(22) Filed: Feb. 4, 2003

(65) Prior Publication Data

US 2003/0201761 A1 Oct. 30, 2003

Related U.S. Application Data

(60) Provisional application No. 60/368,894, filed on Mar. 29, 2002.

(51) Int. Cl.[7] .................................................. G05F 1/40
(52) U.S. Cl. .......................................... 323/272; 363/65
(58) Field of Search ..................... 363/65, 71; 323/225, 323/265, 266, 268, 271, 272, 282, 285

(56) References Cited

U.S. PATENT DOCUMENTS

| | | | | |
|---|---|---|---|---|
| 6,137,274 A | * | 10/2000 | Rajagopalan | ............... 323/272 |
| 6,150,803 A | | 11/2000 | Varga | ......................... 323/282 |
| 6,215,290 B1 | | 4/2001 | Yang et al. | .................. 323/282 |
| 6,278,263 B1 | * | 8/2001 | Walters et al. | .............. 323/272 |
| 6,404,175 B1 | | 6/2002 | Yang et al. | .................. 323/282 |
| 6,414,470 B1 | | 7/2002 | Liu et al. | ..................... 323/272 |
| 6,462,521 B1 | | 10/2002 | Yang et al. | .................. 323/272 |
| 6,495,995 B2 | * | 12/2002 | Groom et al. | .............. 323/283 |

FOREIGN PATENT DOCUMENTS

JP          05326641          12/1993          ........... H01L/21/60

OTHER PUBLICATIONS

Wenkang Huang: "A new control for multi–phase buck converter wirh fast transient response" APEC 2001, 16th Annual IEEE Applied Power Electronics Conference and Exposition, Anaheim, CA, Mar. 4–8, 2001, Annual Applied Power Electronics Conference, New York, NY: IEEE, US, vol. 1 of 2. CONF. 16, Mar. 4, 2001, pp. 273–279.

Arbetter B et al.: "Feed–forward pulse–width modulators for switching power converters" Power Electronics Specialists Conference, 1995, PESC '95 Record., 26th Annual IEEE Atlanta, GA, USA 18–22 Jun. 1995, New York, NY, USA, IEEE, US, Jun. 18, 1995, pp. 601–607.

"Operationsvertaerker" Radio Fernsehen Elektronik, Veb Verlag Technik, Berlin, DE, vol. 42, No. 12,, Dec. 1, 1993, pp. 35–36.

* cited by examiner

Primary Examiner—Gary L. Laxton
(74) Attorney, Agent, or Firm—Allen, Dyer, Doppelt, Milbrath & Gilchrist, P.A.

(57) ABSTRACT

A multi-phase DC—DC converter architecture in which parameters including error signal gains and modulator gains are defined so as to balance multiple converter channel currents, irrespective of whether the converter channels are supplied with the same or different input voltages.

12 Claims, 4 Drawing Sheets

METHOD AND CIRCUIT FOR SCALING AND BALANCING INPUT AND OUTPUT CURRENTS IN A MULTI-PHASE DC-DC CONVERTER USING DIFFERENT INPUT VOLTAGES

CROSS-REFERENCE TO RELATED APPLICATION

The present application claims the benefit of U.S. Application Ser. No. 60/368,894, filed Mar. 29, 2002, by M. Harris, entitled: "Method and Circuit for Scaling and Balancing Input and Output Currents in a Multi-Phase DC—DC Converter Using Different Input Voltages," assigned to the assignee of the present application and the disclosure of which is incorporated herein.

FIELD OF THE INVENTION

The present invention relates in general to DC—DC voltage converters, and is particularly directed to a multi-phase DC-DC converter architecture that is effective to balance multiple converter channel currents, irrespective of whether the converter channels are supplied with the same or different input voltages.

BACKGROUND OF THE INVENTION

Electrical power for an integrated circuit, such as but not limited to a microprocessor chip of a personal computer, is typically supplied by one or more direct current (battery) power sources, such as a buck-mode, pulse width modulation (PWM) based, DC—DC converter of the type diagrammatically shown in FIG. 1. As shown therein, the converter has a control circuit 1 that supplies a synchronous PWM signal to a switching circuit driver 2, for controlling the turn-on and turn-off of a pair of electronic power switching devices, to which a powered load is coupled. In the illustrated converter, the electronic power switching devices are depicted as an upper (or high side) power NMOSFET (or NFET) device 3, and a lower (or low side) power NFET device 4, having their drain-source current flow paths connected in series between an input voltage (Vin) supply rail and ground (GND).

The upper NFET device 3 is turned on and off by an upper gate switching signal UGATE applied to its gate from driver 2, while the lower NFET device 4 is turned on and off by a lower gate switching signal LGATE supplied from driver 2. A common node 5 between the two NFETs is coupled through an inductor 6 to a load reservoir capacitor 7 that is coupled to a reference voltage terminal (GND). The connection 8 between inductor 6 and capacitor 7 serves as an output node from which a desired (regulated) DC output voltage Vout is applied to a LOAD 9 (coupled to GND). The coupling impedance through the inductor is such that the output voltage is equal to the average value of the switched voltage except for some small ripple voltage.

The output node connection 8 is also fed back via a feedback resistor 10 to error amplifier circuitry within PWM controller 1. The error amplifier circuitry is used to regulate the converter's output DC voltage relative to a reference voltage supply value. In addition, the common node 5 between the controllably switched NFETs is coupled via a current sense resistor 11 to current-sensing circuitry within the controller 1, in response to which the controller adjusts duty ratio of the PWM signal, as necessary, to maintain the converter's DC output within a prescribed set of parameters.

Early computer circuits powered by such converters had operational voltages on the order of +/−5 VDC and drew only several amps of current. To realize improved performance, personal computers now employ relatively low operating voltages (on the order of 1.0 to 2.0 VDC), and may draw several tens and more amps of current. Because it is more economical to source such relatively large currents from multiple sources, power supply manufacturers now offer multi-phase DC—DC converters that can be driven by different voltage sources. In addition, if the power requirement of a particular circuit is so high that it cannot be supplied by only one DC source, the point-of-load regulator must obtain the needed power from more than one of the available DC sources. Thus, it is not uncommon for a DC—DC converter to deliver power to a computer motherboard by way of several distinct DC voltage sources including, for example, a 12 V source, a 5 V source, and a 3.3 V source. The current available from each DC sources is limited, so that the circuits on the computer's motherboard must adhere to a system power budget that limits the current drawn from each source.

One example of a circuit having a high power requirement is a computer's graphics adapter card that uses a point-of-load regulator to convert 12 V and 3.3 V DC input voltages to a DC output voltage that is regulated to a precise level significantly less than 3.3 VDC in order to properly operate the computer's graphics processor. In this and other similar cases, the point-of-load DC—DC regulator must possess at least the following functions.

First, it must regulate the DC output voltage to some level determined by a particular load. Secondly, it must regulate the DC output voltage to a precision (accuracy) dictated by a particular load. Third, it must deliver current from more than one parallel channel to a common load. Fourth, it has to balance, to a desired ratio, the currents in parallel channels sourcing a common load. Fifth, it must perform DC—DC conversion to a common load from multiple different input voltages using parallel channels. Sixth, it must regulate input current to some level dictated by the system's power budget.

One circuit architecture for balancing channel currents in a multi-phase DC—DC converter is shown in FIG. 2, which corresponds to FIG. 2 of the U.S. Patent to M. Walters et al, U.S. Pat. No. 6,278,263, entitled: "Multi-Phase Converter With Balanced Currents," assigned to the assignee of the present application and the disclosure of which is incorporated herein. In accordance with this architecture, multi-phase channel currents of a plurality of pulse width modulator (PWM) comparators (four of which are shown at 68, 70, 72 and 74) are appropriately balanced, by supplying a correction offset to a control signal output by an error amplifier 42. The control signal has the proper sign and magnitude as to cause the output voltage to converge on a reference voltage REF, thus regulating the output voltage to the reference voltage. The error signal is common to the control circuitry for each channel i.

Measurements of the current in each channel are weighted and summed together to produce a signal proportional to the average channel current. A voltage $V_{ISENSEi}$ representative of the current in each channel is then subtracted from a signal $V_{AVERAGE}$, which is proportional to the average current, to realize current-error signals that are proportional to the difference between each channel's current and the average channel current. The current error signals are combined with the control signal to produce a correction to the current in each channel. The correction is of sufficient magnitude to cause the current in each channel to converge on the average current.

Now although the current balancing arrangement of FIG. 2 works well when each of the multi-phase converter channels employs the same DC input voltage, it is inadequate to balance the currents without modification when the channels' DC sources have different voltage levels.

SUMMARY OF THE INVENTION

In accordance with the present invention, this shortcoming is obviated by an augmentation of the multiphase DC—DC converter architecture of FIG. 2, that is effective to balance the various channel currents, irrespective of whether the channels' DC sources supply the same or different voltage levels. Pursuant to a first embodiment, the error-signal gains of the respective channels are set equal to the same value and at very high values. With each of the gains set at a very high value, the difference between the currents in adjacent channels becomes very small, and converges on zero as the gain approaches infinity. A practical circuit implementation of this first embodiment involves incorporating the gains together with the difference nodes using an operational amplifier coupled in an integrating configuration for a respective channel.

In a second embodiment, the gains of all the channels are set equal to one another. In addition, the modulator gains are set equal to each other. This may be accomplished by making the amplitudes of the sawtooth waveforms applied to the respective PWM comparators proportional to their input voltages.

Pursuant to a third embodiment, rather than make the amplitudes of the sawtooth signals supplied to the respective PWM comparators proportional to input voltage, the outputs of the combining circuits that feed the PWM comparators are scaled by respective scaling circuits in inverse proportion to their associated modulator gains, to produce the same effect as the second embodiment.

DETAILED DESCRIPTION

Figure 1:
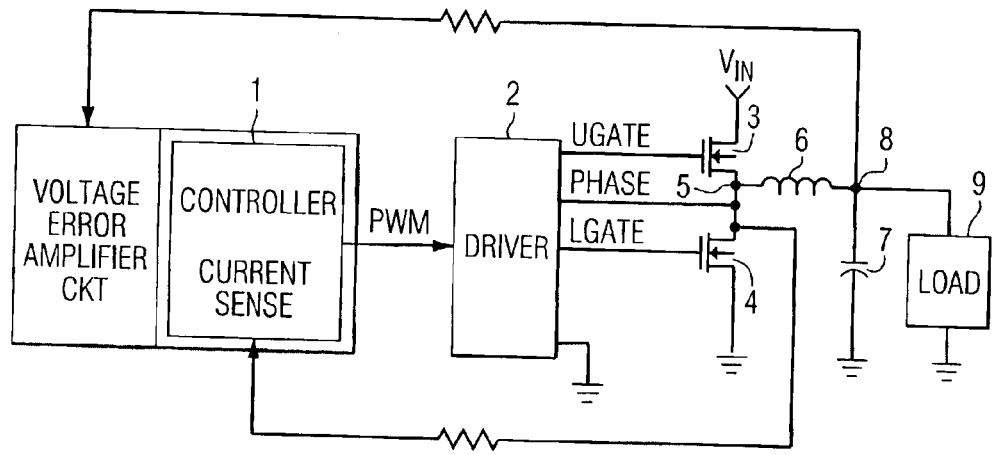
FIG. 1 diagrammatically illustrates the general architecture of a buck-mode, pulse width modulation (PWM) based, DC—DC converter.
Figure 2:
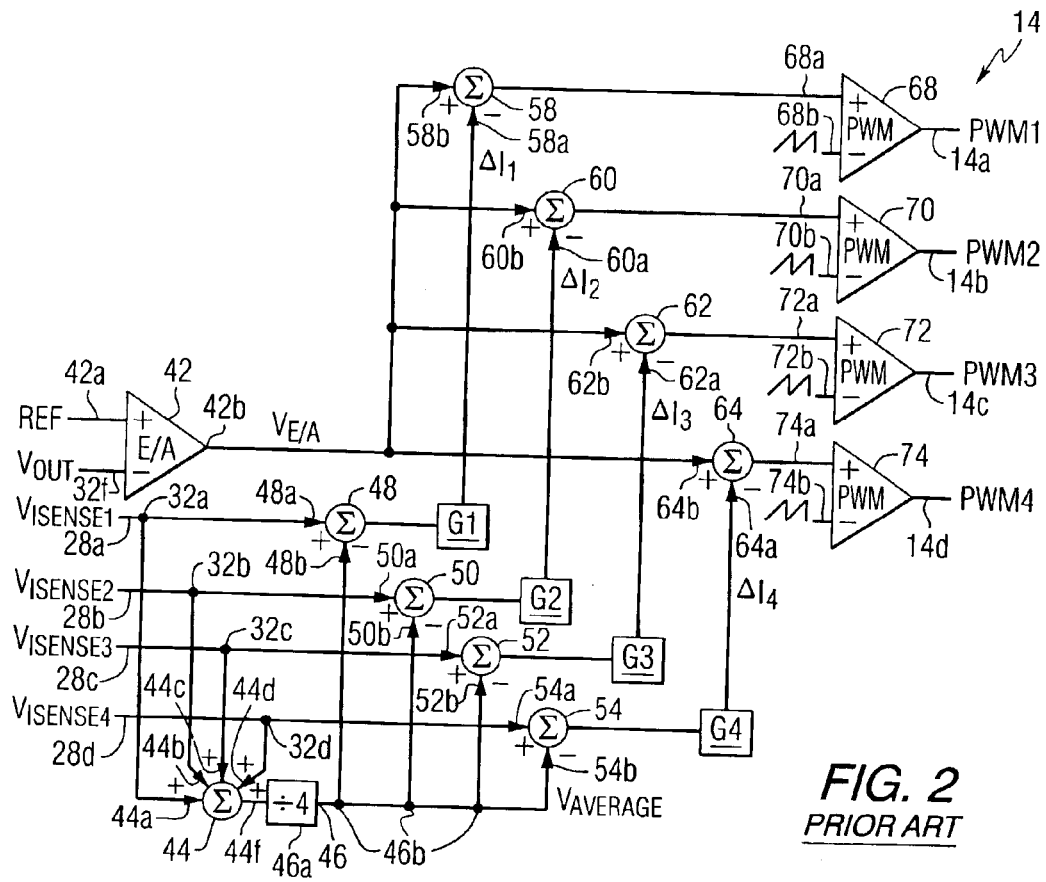
FIG. 2 corresponds to FIG. 2 of U.S. Pat. No. 6,278,263.

In order to facilitate an appreciation of the present invention it is initially useful to examine the operation of the multi-phase converter circuit of FIG. 2. Consider the operation of the PWM comparator 68, which generates the pulse that is used to drive a switch (FET) to connect the channel-1 input voltage through a coupling impedance to the output, as generally shown in FIG. 1 described above. The switch (FET) is closed when the voltage at its input 68$a$ from subtraction circuit 58 is greater than the sawtooth voltage at input 68$b$. The switch is otherwise open. As pointed out above, the coupling impedance is such that the output voltage is equal to the average value of the switched voltage except for a relatively small ripple voltage.

The average value of the switched voltage is proportional to the control signal $V_{EA}$ (the channel-1 input voltage), and is inversely proportional to the amplitude of the sawtooth voltage at the comparator input 68$b$. This proportionality can be expressed as a gain block G shown in FIG. 3, which constitutes a redrawing of components of FIG. 2 together with the incorporation of the PWM comparators into respective PWM modulator components $A_1$, $A_2$, $A_3$ and $A_4$, which are block representations of the switch mode PWM modulator components of FIG. 1. Each PWM modulator has a respective modulator gain $A_i$ that effectively corresponds to the ratio of its associated input voltage $Vin_i$ to the peak-to-peak excursion of its associated ramp or sawtooth waveform.

Figure 3:
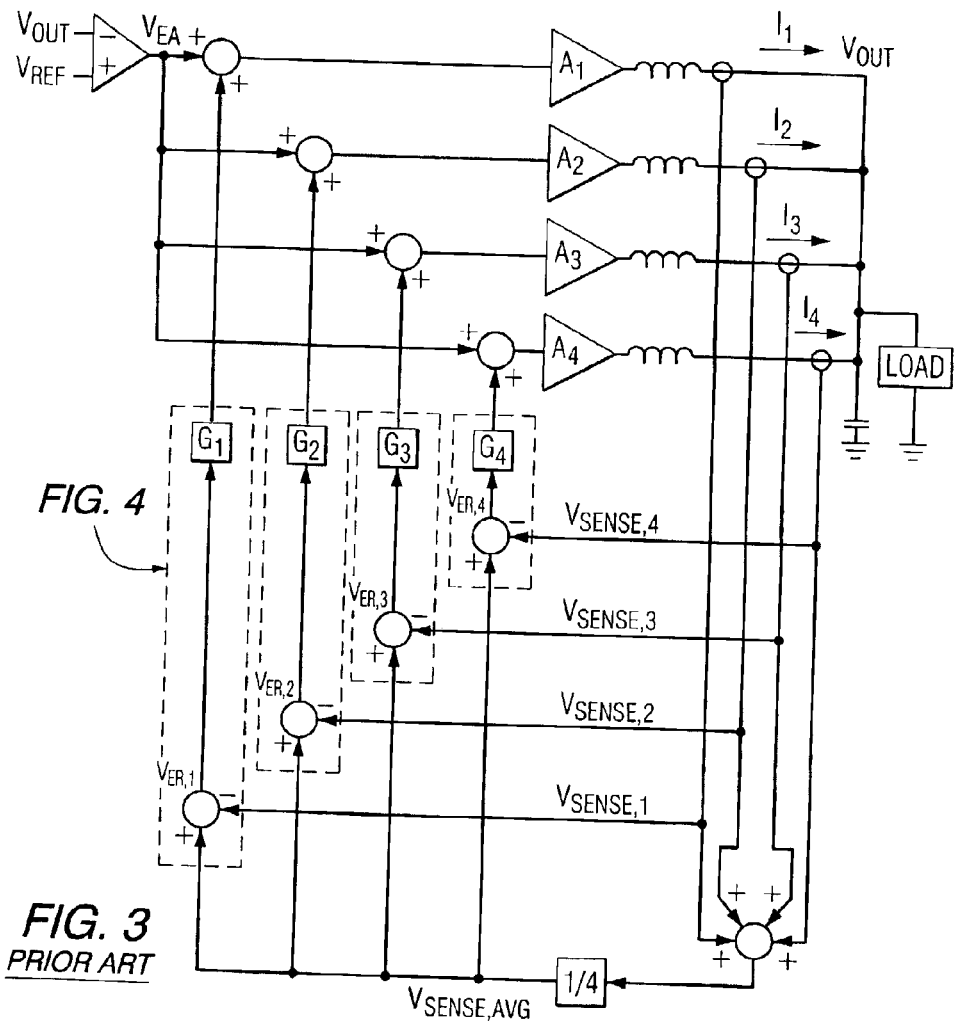
FIG. 3 is a rearranged drawing of FIG. 2.

In FIG. 3, the sense voltages $V_{SENSE}$ are related to the channel currents by a transducer gain k, so that, for example, the voltage $V_{SENSE,1}$ equals k times the current $I_1$. An analysis of the steady-state current-balance error derived from FIG. 3 yields the following equation (1), in which error is expressed as the difference of currents of two of the channels, here channel-1 and channel-2. Equation (1) may be generalized to any two channel currents by simple substitution.

$$I_1-I_2=\{V_{EA}/k\}\{(G_2-G_1)/G_2G_1\}-\{V_{OUT}/k\}\{(A_2G_2-A_1G_1)/A_1G_1A_2G_2\} \quad (1)$$

For most practical implementations of the circuit of FIGS. 2 and 3, the error-signal gains $G_1$, $G_2$, $G_3$, $G_4$ are all equal. From equation (1) it can be seen that this is necessary in order to reduce the steady state error. If the error signal gains $G_1$, $G_2$, $G_3$, and $G_4$ are all equal to the same value G, then equation (1) may be rewritten as the following equation (2):

$$I_1-I_2=\{V_{OUT}/k\}\{(A_1-A_2)/GA_1A_2\} \quad (2)$$

Equation (2) reveals that the steady-state error is directly proportional to the differences between the modulator gains and inversely proportional to the error-signal gain.

Figure 4:
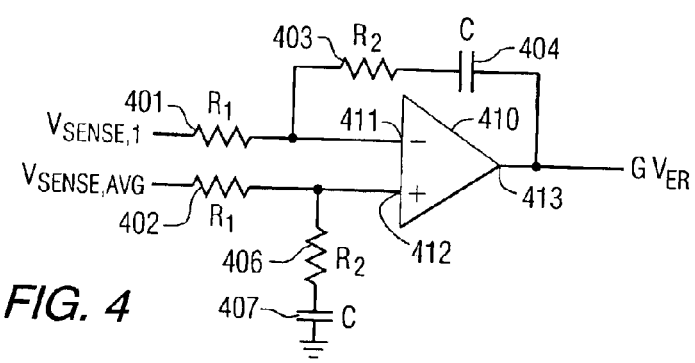
FIG. 4 diagrammatically illustrates an augmentation of a subcomponent of an individual channel of the multi-phase architecture of FIGS. 2 and 3 in accordance with a first embodiment of the invention.

First Embodiment (FIG. 4)

In accordance with a first embodiment of the invention, the error-signal gains of the respective channels (e.g., gains $G_1$, $G_2$, $G_3$, and $G_4$ in the four channel architecture of FIGS. 2 and 3) are set equal to one another and are set to have very high values. With each of the gains at a very high value (e.g., on the order of 10,000 or more (practically infinite), the difference between $I_1$ and $I_2$ in equation (2) becomes very small. Namely, equation (2) shrinks to zero as G approaches infinity. A practical circuit implementation of this first embodiment involves incorporating the gains together with the difference nodes using an operational amplifier for a respective channel in an integrating configuration.

FIG. 4 shows such a configuration for an individual channel (here, channel-1), wherein the sensed current representative voltage $V_{SENSE,1}$ is coupled through a first input resistor 401 having a value $R_1$ to an inverting (−) input 411 of operational amplifier 410. The average value of the sensed current representative voltage $V_{SENSE,AVG}$ is coupled through a second input resistor 402, also having a value $R_1$, to an non-inverting (+) input 412 of operational amplifier 410. The inverting input is couple to ground through a series circuit containing a resistor 403 having a value $R_2$ and a capacitor 404 having a value C. The output 413 of operational amplifier 410, which produces the output voltage $GV_{ER}$, is coupled to the inverting input 411 through a series circuit containing a resistor 406 having a value $R_2$ and a capacitor 407 of value C. The RC circuits set the circuit's frequency response. The circuit of FIG. 4 is implemented once for each difference node and gain block G of FIG. 3.

Figure 5:
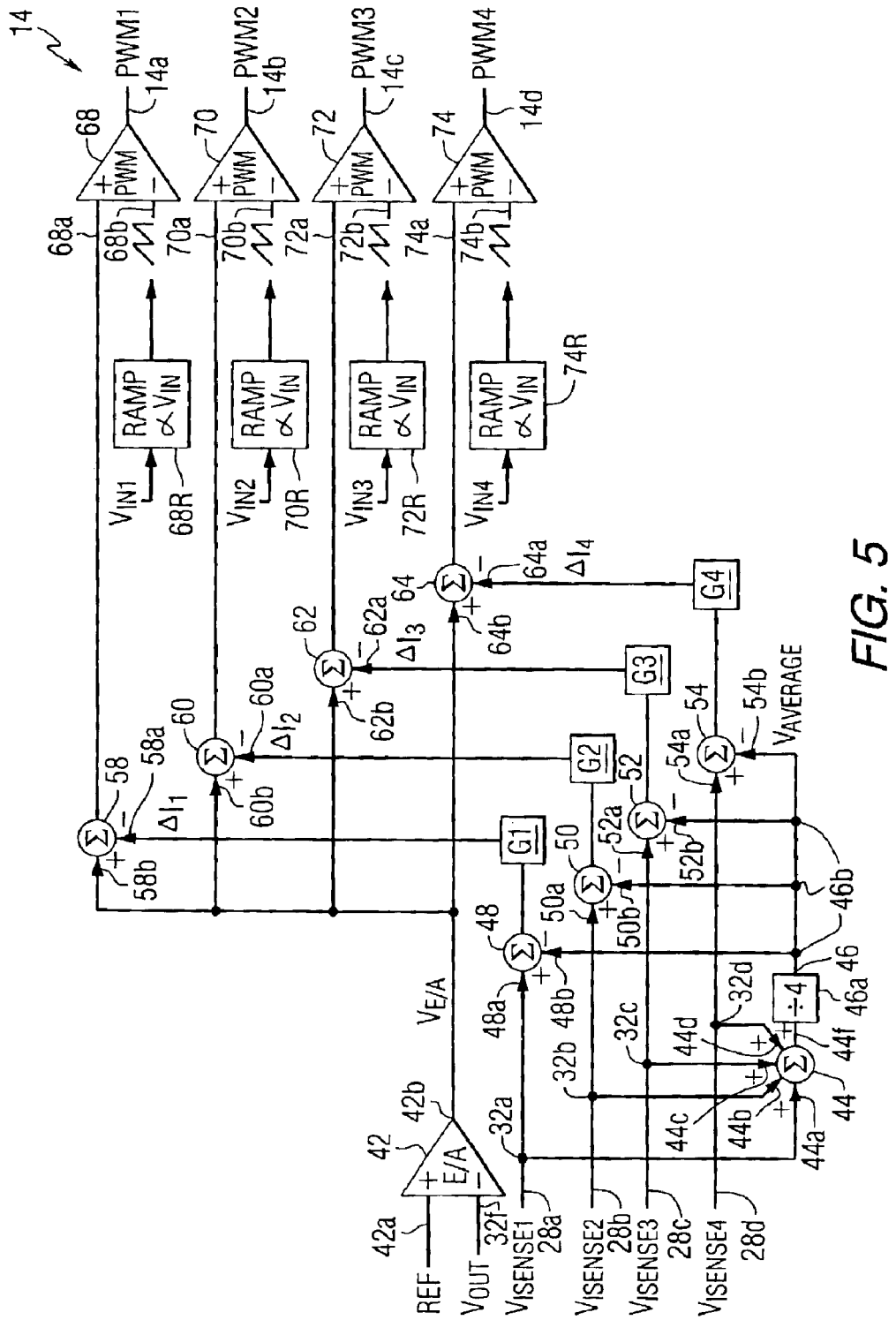
FIG. 5 diagrammatically illustrates a modification of the multi-phase architecture of FIGS. 2 and 3 in accordance with a second embodiment of the invention.

Second Embodiment (FIG. 5)

As described above, in the first embodiment of the invention, the error-signal gains $G_1$, $G_2$, $G_3$, and $G_4$ in the four channel architecture of FIGS. 2 and 3 are equal to the same value. In accordance with a second embodiment of the invention, the gains of all the channels are set equal to one another. In addition, the modulator gains $A_1$, $A_2$, $A_3$, and $A_4$ are set equal to each other. This may be readily achieved by making the amplitudes of the sawtooth waveforms applied to the second inputs 68b, 70b, 72b and 74b of the respective comparators 68, 70, 72 and 74 proportional to their associated input voltages. As circuits for generating a ramp voltage whose amplitude is proportional to input voltage are conventional, they will not be detailed here. Instead they are shown in block diagram form at 68R, 70R, 72R and 74R in FIG. 5. It may be noted that this is similar to a technique commonly referred to as feed-forward control wherein the modulator gains are adjusted in this fashion to cause a DC—DC converter to be insensitive to changes in input voltage. However, its use for the purpose of providing current balance in a multi-phase converter as described herein is new.

Figure 6:
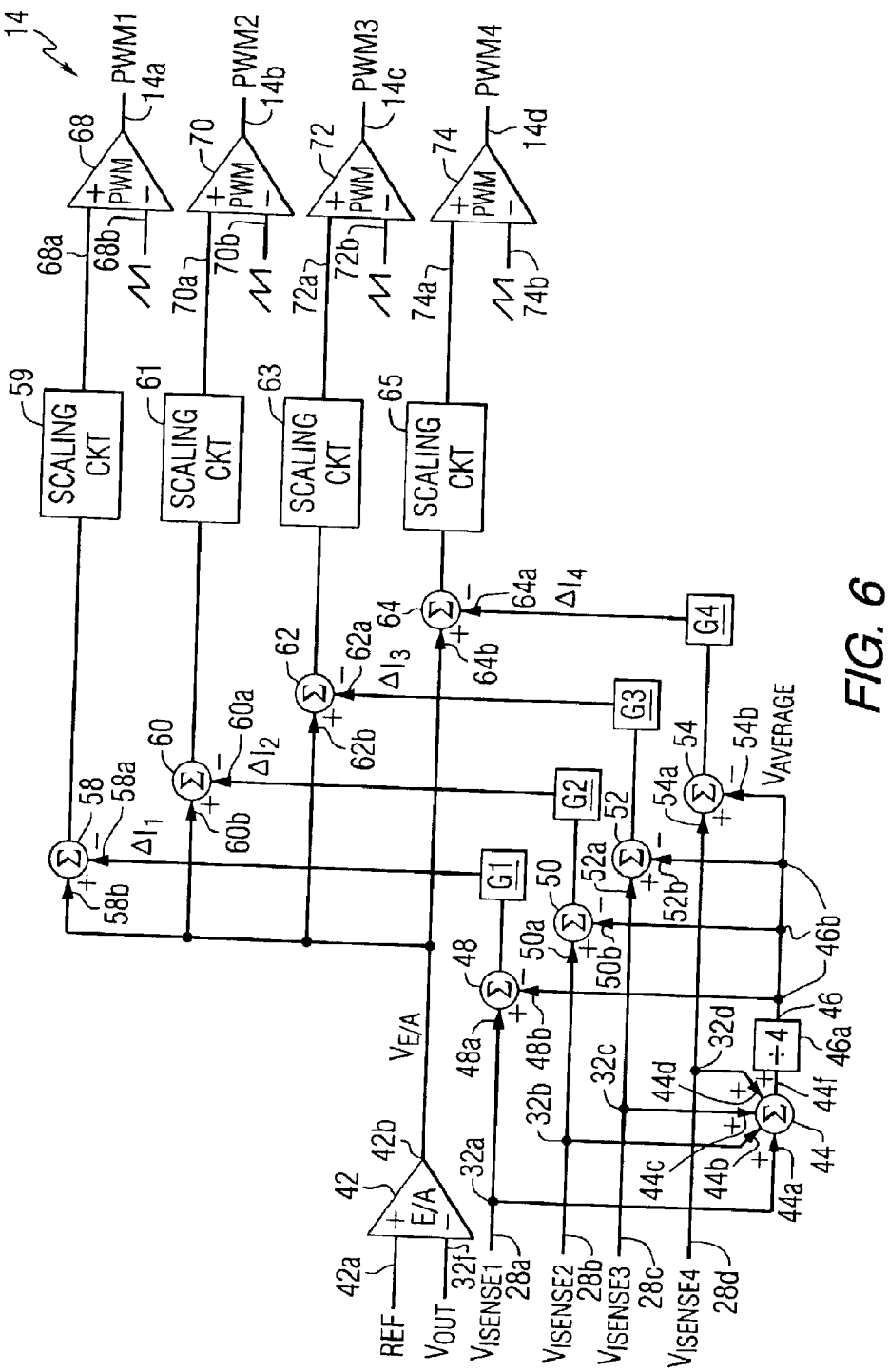
FIG. 6 diagrammatically illustrates a modification of the multi-phase architecture of FIGS. 2 and 3 in accordance with a third embodiment of the invention.

Third Embodiment (FIG. 6)

Pursuant to a third embodiment, shown in FIG. 6, which is a modification of the second embodiment, rather than make the amplitudes of the sawtooth inputs to the respective comparators proportional to input voltage, the outputs of the subtraction circuits 58, 60, 62 and 64 are coupled to the modulators through respective scaling circuits 59, 61, 63 and 65. Each of these scaling circuits is operative to scale its input voltage inversely proportional to its associated modulator gain, or by $(1/A_i)$, so as to produce the same effect as the second embodiment of FIG. 5.

While I have shown and described an embodiment in accordance with the present invention, it is to be understood that the same is not limited thereto but is susceptible to numerous changes and modifications as known to a person skilled in the art. I therefore do not wish to be limited to the details shown and described herein, but intend to cover all such changes and modifications as are obvious to one of ordinary skill in the art.

What is claimed:

1. A multi-phase DC—DC converter producing an output voltage at an output node comprising:
    a plurality of converter channels, each of said plurality of converter channels including a converter channel input, and a converter channel output coupled to said output node, each of said plurality of converter channels being operative to generate a converter channel current and to adjust said converter channel current in response to a control signal electrically connected to each said converter channel input; and
    a control circuit, comprising:
        an error signal comparator that is operative to generate an error signal in accordance with a prescribed relationship between said output voltage and a reference voltage; and
        a plurality of control circuit channels, each of said plurality of control circuit channels corresponding to one of said plurality of converter channels, each respective one of said plurality of control circuit channels including
            a channel current sensor that is operative to generate a channel current signal representative of a corresponding converter channel current;
            a differential combiner that is operative to generate a differential channel current signal representative of a difference between said channel current signal and an average of an overall average current for said plurality of converter channels;
            a differential error signal generator that is operative to generate a differential error signal representative a difference between said error signal and said differential channel current signal; and
            a pulse width modulator coupled to receive a ramp voltage having an amplitude proportional to a respective input voltage for said respective one of said control circuit channels and said differential error signal, and producing a pulse width modulated output voltage in accordance with a comparison of said ramp voltage with said differential error signal;
    outputs of said pulse width modulators being combined to provide a composite output current at said output node; and wherein
    ramp voltages of said pulse width modulators of said plurality of control circuit channels have different input voltages; and
    said plurality of control circuit channels are configured to balance said converter channel currents.

2. The multi-phase DC—DC converter according to claim 1, wherein said plurality of control circuit channels have the same gains.

3. The multi-phase DC—DC converter according to claim 2, wherein said pulse width modulators have the same modulator gains.

4. The multi-phase DC—DC converter according to claim 3, wherein a respective differential error signal is scaled inversely proportional to the gain of said pulse width modulator of a respective converter channel.

5. In a multi-phase DC—DC converter producing an output voltage at an output node and including a plurality of converter channels, each of said plurality of converter channels including a converter channel input, and a converter channel output coupled to said output node, each of said plurality of converter channels being operative to generate a converter channel current and to adjust said converter channel current in response to a control signal electrically connected to each said converter channel input; and a control circuit, said control circuit having an error signal comparator that is operative to generate an error signal in accordance with a prescribed relationship between said output voltage and a reference voltage, and a plurality of control circuit channels, each of said plurality of control circuit channels corresponding to one of said plurality of converter channels, and wherein each respective one of said plurality of control circuit channels includes:
    a channel current sensor that is operative to generate a channel current signal representative of a corresponding converter channel current;
    a differential combiner that is operative to generate a differential channel current signal representative of a difference between said channel current signal and an average of an overall average current for said plurality of converter channels;
    a differential error signal generator that is operative to generate a differential error signal representative a difference between said error signal and said differential channel current signal; and
    a pulse width modulator coupled to receive a ramp voltage having an amplitude proportional to a respective input voltage for said respective one of said control circuit channels and said differential error signal, and producing a pulse width modulated output voltage in accordance with a comparison of said ramp voltage with said differential error signal, and wherein ramp voltages of said pulse width modulators of said plurality of control circuit channels have different input voltages;

the improvement wherein said plurality of control circuit channels are configured to balance said converter channel currents.

6. The improvement according to claim 5, wherein said plurality of control circuit channels have the same gains.

7. The improvement according to claim 5, wherein said pulse width modulators have the same modulator gains.

8. The improvement according to claim 7, wherein a respective differential error signal is scaled inversely proportional to the gain of said pulse width modulator of a respective converter channel.

9. A method of operating a multi-phase DC—DC converter, that generates an output voltage at an output node and contains a plurality of converter channels, each of said plurality of converter channels including a converter channel input, and a converter channel output coupled to said output node, each of said plurality of converter channels being operative to generate a converter channel current and to adjust said converter channel current in response to a control signal electrically connected to each said converter channel input, and a control circuit, said control circuit having an error signal comparator that is operative to generate an error signal in accordance with a prescribed relationship between said output voltage and a reference voltage, and a plurality of control circuit channels, each of said plurality of control circuit channels corresponding to one of said plurality of converter channels, and wherein each respective one of said plurality of control circuit channels includes:

a channel current sensor that is operative to generate a channel current signal representative of a corresponding converter channel current;

a differential combiner that is operative to generate a differential channel current signal representative of a difference between said channel current signal and an average of an overall average current for said plurality of converter channels;

a differential error signal generator that is operative to generate a differential error signal representative a difference between said error signal and said differential channel current signal; and a pulse width modulator coupled to receive a ramp voltage having an amplitude proportional to a respective input voltage for said respective one of said control circuit channels and said differential error signal, and produce producing a pulse width modulated output voltage in accordance with a comparison of said ramp voltage with said differential error, signal;

said method comprising the step of:

(a) supplying different input voltages to ramp voltage generators for selected ones of said pulse width modulators of said plurality of control-circuit channels; and (b) causing said plurality of control circuit channels to balance said converter channel currents.

10. The method according to claim 9, wherein step (b) includes configuring said plurality of control circuit channels to have the same gains.

11. The method according to claim 10, wherein step (b) comprises configuring said pulse width modulators to have the same modulator gains.

12. The method according to claim 11, wherein said differential error signal is scaled in inverse proportion to the gain of said pulse width modulator of a respective converter channel.

* * * * *